US010486100B1

(12) United States Patent
Freeman et al.

(10) Patent No.: US 10,486,100 B1
(45) Date of Patent: Nov. 26, 2019

(54) COALESCER FOR CO-CURRENT CONTACTORS

(71) Applicants: Stephanie A. Freeman, Houston, TX (US); Edward J. Grave, Montgomery, TX (US); J. Tim Cullinane, Montgomery, TX (US); P. Scott Northrop, Spring, TX (US); Norman K. Yeh, Shenandoah, TX (US)

(72) Inventors: Stephanie A. Freeman, Houston, TX (US); Edward J. Grave, Montgomery, TX (US); J. Tim Cullinane, Montgomery, TX (US); P. Scott Northrop, Spring, TX (US); Norman K. Yeh, Shenandoah, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 0 days.

(21) Appl. No.: 16/513,156

(22) Filed: Jul. 16, 2019

Related U.S. Application Data

(62) Division of application No. 15/009,936, filed on Jan. 29, 2016, now Pat. No. 10,391,442.

(Continued)

(51) Int. Cl.
  *B01D 11/04* (2006.01)
  *B01D 53/14* (2006.01)
  (Continued)

(52) U.S. Cl.
  CPC .......... *B01D 53/1406* (2013.01); *B01D 11/04* (2013.01); *B01D 11/0419* (2013.01);
  (Continued)

(58) Field of Classification Search
  CPC . B01D 11/04; B01D 11/0419; B01D 11/0488; B01D 2011/005;
  (Continued)

(56) References Cited

U.S. PATENT DOCUMENTS

| 1,951,647 A | 3/1934 | Cooke ............................ 196/46 |
| 2,847,200 A | 8/1958 | Ung ............................. 202/158 |

(Continued)

FOREIGN PATENT DOCUMENTS

| CA | 2144585 | 6/1996 | ............. B01D 53/52 |
| DE | 10162457 | 7/2003 | ............... B01D 3/32 |

(Continued)

OTHER PUBLICATIONS

U.S. Appl. No. 62/117,234, filed Feb. 17, 2015, Northrop, P. Scott et al.

(Continued)

*Primary Examiner* — Cabrena Holecek
(74) *Attorney, Agent, or Firm* — ExxonMobil Upstream Research Company—Law Department

(57) ABSTRACT

The disclosure includes a method, comprising passing a fluid into a co-current contactor, passing a solvent into the co-current contactor, dividing the solvent into solvent droplets having a first average droplet size, placing the fluid in contact with the solvent droplets to create a combined stream, coalescing at least a portion of the solvent droplets to create solvent droplets having a second average droplet size, wherein the second average droplet size is greater than the first average droplet size, and separating the fluid and the solvent.

7 Claims, 5 Drawing Sheets

Related U.S. Application Data

(60) Provisional application No. 62/132,631, filed on Mar. 13, 2015.

(51) Int. Cl.
| | |
|---|---|
| *B01D 53/52* | (2006.01) |
| *B01D 53/79* | (2006.01) |
| *B01D 11/00* | (2006.01) |
| *B01D 53/18* | (2006.01) |
| *C10L 3/10* | (2006.01) |
| *C10G 21/00* | (2006.01) |
| *C10G 21/16* | (2006.01) |
| *C10G 21/30* | (2006.01) |
| *C10G 70/06* | (2006.01) |

(52) U.S. Cl.
CPC ...... *B01D 11/0488* (2013.01); *B01D 53/1462* (2013.01); *B01D 53/18* (2013.01); *B01D 53/526* (2013.01); *B01D 53/79* (2013.01); *C10G 21/16* (2013.01); *C10G 21/30* (2013.01); *C10G 70/06* (2013.01); *C10L 3/103* (2013.01); *C10L 3/104* (2013.01); *B01D 2011/005* (2013.01); *B01D 2252/204* (2013.01); *B01D 2257/304* (2013.01); *B01D 2257/504* (2013.01); *C10G 21/00* (2013.01); *C10G 2300/207* (2013.01); *C10L 3/10* (2013.01); *C10L 2290/18* (2013.01); *C10L 2290/541* (2013.01)

(58) Field of Classification Search
CPC ........ B01D 2252/204; B01D 2257/304; B01D 2257/504; B01D 53/1406; B01D 53/1462; B01D 53/18; B01D 53/526; B01D 53/79; C10G 21/00; C10G 21/16; C10G 21/30; C10G 2300/207; C10G 70/06; C10L 2290/18; C10L 2290/541; C10L 3/10; C10L 3/103; C10L 3/104

See application file for complete search history.

(56) References Cited

U.S. PATENT DOCUMENTS

| | | | |
|---|---|---|---|
| 3,767,766 A | 10/1973 | Tjoa et al. | 423/220 |
| 3,773,472 A | 11/1973 | Hausberg et al. | 422/169 |
| 3,989,811 A | 11/1976 | Hill | 423/573 |
| 4,073,832 A | 2/1978 | McGann | 261/118 |
| 4,204,934 A | 5/1980 | Warren et al. | 204/186 |
| 4,318,717 A * | 3/1982 | Sohier | B01D 47/06 95/199 |
| 4,369,167 A | 1/1983 | Weir, Jr. | 423/210 |
| 4,405,580 A | 9/1983 | Stogryn et al. | 423/226 |
| 4,421,725 A | 12/1983 | Dezael et al. | 423/226 |
| 4,589,896 A | 5/1986 | Chen et al. | 62/28 |
| 4,603,035 A | 7/1986 | Connell et al. | 423/226 |
| 4,678,648 A | 7/1987 | Wynn | 423/228 |
| 4,701,188 A | 10/1987 | Mims | 55/20 |
| 4,752,307 A | 6/1988 | Asmus et al. | 55/73 |
| 4,824,645 A | 4/1989 | Jones et al. | 423/226 |
| 4,885,079 A | 12/1989 | Eppig et al. | 208/13 |
| 5,067,971 A | 11/1991 | Bikson et al. | 55/16 |
| 5,085,839 A | 2/1992 | Scott et al. | 423/210 |
| 5,091,119 A | 2/1992 | Biddulph et al. | 261/114.3 |
| 5,093,094 A | 3/1992 | Van Kleek et al. | 423/224 |
| 5,186,836 A | 2/1993 | Gauthier et al. | 210/512.1 |
| 5,209,821 A | 5/1993 | Shaw et al. | 159/4.01 |
| 5,439,509 A | 8/1995 | Spink et al. | 95/166 |
| 5,462,584 A | 10/1995 | Gavlin et al. | 95/231 |
| 5,603,908 A | 2/1997 | Yoshida et al. | 423/220 |
| 5,648,053 A | 7/1997 | Mimura et al. | 423/210 |
| 5,664,426 A | 9/1997 | Lu | 62/93 |
| 5,713,985 A | 2/1998 | Hamilton | 95/90 |
| 5,735,936 A | 4/1998 | Minkkinen et al. | 95/49 |
| 5,810,897 A | 9/1998 | Konosu | 55/418 |
| 5,837,105 A | 11/1998 | Stober et al. | 203/40 |
| 5,907,924 A | 6/1999 | Collin et al. | 45/194 |
| 5,988,283 A | 11/1999 | Gann | 166/357 |
| 6,063,163 A | 5/2000 | Carmody | 95/187 |
| 6,071,484 A | 6/2000 | Dingman et al. | 423/229 |
| 6,089,317 A | 7/2000 | Shaw | 166/265 |
| 6,214,097 B1 | 4/2001 | Laslo | 96/236 |
| 6,228,145 B1 | 5/2001 | Falk-Pedersen et al. | 95/44 |
| 6,284,023 B1 | 9/2001 | Torkildsen et al. | 95/216 |
| 6,830,608 B1 | 12/2004 | Peters | 261/112 |
| 6,881,389 B2 | 4/2005 | Paulsen et al. | 423/210 |
| 7,018,451 B1 | 3/2006 | Torkildsen et al. | 95/216 |
| 7,128,276 B2 | 10/2006 | Nilsen et al. | 236/124 |
| 7,144,568 B2 | 12/2006 | Ricard et al. | 423/659 |
| 7,152,431 B2 | 12/2006 | Amin et al. | 62/637 |
| 7,175,820 B2 | 2/2007 | Minkkinen et al. | 423/228 |
| RE39,826 E | 9/2007 | Lu | 62/632 |
| 7,273,513 B2 | 9/2007 | Linga et al. | 95/235 |
| 7,560,088 B2 | 7/2009 | Keller et al. | 423/537.1 |
| 7,811,343 B2 | 10/2010 | Toma | 55/318 |
| 8,071,046 B2 | 12/2011 | Hassan et al. | 422/225 |
| 8,137,444 B2 | 3/2012 | Farsad et al. | 96/235 |
| 8,240,640 B2 | 8/2012 | Nakayama | 261/109 |
| 8,268,049 B2 | 9/2012 | Davydov | 95/199 |
| 8,336,863 B2 | 12/2012 | Neumann et al. | 261/115 |
| 8,343,360 B2 | 1/2013 | Schook | 210/788 |
| 8,454,727 B2 | 6/2013 | Dunne et al. | 95/51 |
| 8,475,555 B2 | 7/2013 | Betting et al. | 55/416 |
| 8,652,237 B2 | 2/2014 | Heldebrant et al. | 95/235 |
| 8,741,127 B2 | 6/2014 | Koseoglu et al. | 20/57 |
| 8,899,557 B2 | 12/2014 | Cullinane | 261/76 |
| 8,900,347 B2 | 12/2014 | Boulet et al. | 95/114 |
| 9,149,761 B2 | 10/2015 | Northrop et al. | 166/401 |
| 9,192,896 B2 | 11/2015 | Hassan et al. | B01F 7/00766 |
| 9,238,193 B2 | 1/2016 | Ji et al. | B01D 53/1468 |
| 9,353,315 B2 | 5/2016 | Heath et al. | C10G 5/06 |
| 9,599,070 B2 | 3/2017 | Huntington et al. | 60/39 |
| 9,764,252 B2 | 9/2017 | Whitney et al. | B01D 17/0217 |
| 9,902,914 B2 | 2/2018 | Mak | C10L 3/104 |
| 10,130,897 B2 | 11/2018 | Grave et al. | 3/26 |
| 10,300,429 B2 | 5/2019 | Grave et al. | 53/14 |
| 2001/0037876 A1 | 11/2001 | Oost et al. | 165/133 |
| 2003/0005823 A1 | 1/2003 | LeBlanc et al. | 95/149 |
| 2003/0155438 A1 | 8/2003 | Boee et al. | 239/533.2 |
| 2004/0092774 A1 | 5/2004 | Mimura et al. | 564/497 |
| 2005/0006086 A1 | 1/2005 | Gramme | 166/105.5 |
| 2006/0123993 A1 | 6/2006 | Henriksen | 96/234 |
| 2006/0185320 A1 | 8/2006 | Dureiko | 52/749 |
| 2007/0205523 A1 | 9/2007 | Kojima | 261/79.2 |
| 2008/0006011 A1 | 1/2008 | Larnholm et al. | 55/421 |
| 2008/0107581 A1 | 5/2008 | Sparling et al. | 423/222 |
| 2008/0115532 A1 | 5/2008 | Jager | 62/620 |
| 2008/0190291 A1 | 8/2008 | Krehbiel et al. | 95/241 |
| 2008/0257788 A1 | 10/2008 | Leito | 209/44 |
| 2008/0290021 A1 | 11/2008 | Buijs et al. | 210/500.27 |
| 2009/0213687 A1 | 8/2009 | Linga et al. | 366/167.2 |
| 2009/0241778 A1 | 10/2009 | Lechnick et al. | 95/177 |
| 2010/0229725 A1 | 9/2010 | Farstad et al. | 96/74 |
| 2011/0036122 A1 | 2/2011 | Betting et al. | 62/636 |
| 2011/0168019 A1 | 7/2011 | Northrop et al. | 95/186 |
| 2011/0185633 A1 | 8/2011 | Betting et al. | 48/127.5 |
| 2011/0217218 A1 | 9/2011 | Gupta | 423/228 |
| 2011/0296869 A1 | 12/2011 | Buhrman et al. | 62/617 |
| 2012/0060691 A1 | 3/2012 | Bieri et al. | 95/270 |
| 2012/0204599 A1 | 8/2012 | Northrop et al. | 62/617 |
| 2012/0240617 A1 | 9/2012 | Weiss et al. | 62/611 |
| 2013/0017144 A1 | 1/2013 | Menzel | 423/542 |
| 2014/0033921 A1 | 2/2014 | Peck et al. | 95/269 |
| 2014/0123851 A1 | 5/2014 | Jamtvedt et al. | 95/149 |
| 2014/0245889 A1 | 9/2014 | Hamre et al. | 95/223 |
| 2014/0331862 A1 | 11/2014 | Cullinane et al. | 95/186 |
| 2014/0335002 A1 | 11/2014 | Northrop et al. | 423/228 |
| 2014/0366446 A1 | 12/2014 | Sharma et al. | 48/127.3 |
| 2014/0373714 A1 | 12/2014 | Cloud et al. | 95/273 |
| 2015/0013539 A1 | 1/2015 | Eriksen et al. | 95/172 |
| 2015/0026787 A1 | 1/2015 | Zhang et al. | C10L 3/00 |
| 2015/0083425 A1 | 3/2015 | Sullivan et al. | |

(56) References Cited

U.S. PATENT DOCUMENTS

| | | | |
|---|---|---|---|
| 2015/0135954 A1 | 5/2015 | Li et al. | |
| 2015/0191360 A1 | 7/2015 | Weiss et al. | C01B 31/20 |
| 2015/0322580 A1 | 11/2015 | Little | 205/554 |
| 2016/0060190 A1 | 3/2016 | Trucko et al. | C07C 7/005 |
| 2016/0136569 A1 | 5/2016 | Lee et al. | B01D 53/18 |
| 2016/0199774 A1 | 7/2016 | Grave et al. | 95/235 |
| 2016/0236140 A1 | 8/2016 | Northrop et al. | 95/210 |
| 2016/0263516 A1 | 9/2016 | Freeman et al. | 426/226 |
| 2016/0288045 A1 | 10/2016 | Kramer et al. | B01D 53/1493 |
| 2017/0145803 A1 | 5/2017 | Yeh et al. | E21B 43/36 |
| 2017/0157553 A1 | 6/2017 | Northrop et al. | 96/314 |
| 2017/0184392 A1 | 6/2017 | Huntington et al. | F02C 3/34 |
| 2017/0239612 A1 | 8/2017 | Mondkar et al. | 423/220 |
| 2018/0071674 A1 | 3/2018 | Freeman et al. | 423/228 |
| 2018/0361307 A1 | 12/2018 | Yeh et al. | B01D 53/1406 |
| 2018/0361309 A1 | 12/2018 | Yeh et al. | B01D 53/185 |
| 2018/0362858 A1 | 12/2018 | Ramkumar et al. | C10G 25/003 |

FOREIGN PATENT DOCUMENTS

| | | | |
|---|---|---|---|
| EP | 0191985 | 8/1986 | B01D 53/18 |
| EP | 0301623 | 2/1989 | B01D 53/14 |
| EP | 1438484 | 4/2003 | B01D 17/02 |
| EP | 1141520 | 5/2003 | E21B 43/40 |
| EP | 1340536 | 9/2003 | B01J 19/30 |
| EP | 2134446 | 9/2015 | B01D 54/04 |
| GB | 1234862 | 6/1971 | B01D 53/18 |
| GB | 1377026 | 12/1974 | B01D 47/10 |
| GB | 1579249 | 11/1980 | H01J 1/13 |
| GB | 2079177 | 1/1982 | B01D 53/18 |
| GB | 2094951 | 9/1982 | F22B 3/04 |
| GB | 2414688 | 12/2006 | B01D 53/26 |
| JP | 48-066073 | 9/1971 | B01D 47/10 |
| JP | 53-032109 | 3/1978 | A61K 9/08 |
| JP | 06-170153 | 12/1992 | B01D 53/34 |
| JP | 2014-000500 | 1/2014 | B01D 53/14 |
| WO | WO1993/010883 | 6/1993 | B01D 53/14 |
| WO | WO1997/046304 | 12/1997 | B01D 53/26 |
| WO | WO1999/013966 | 3/1999 | B01D 53/18 |
| WO | WO2000/056844 | 9/2000 | C10L 3/10 |
| WO | WO2002/032536 | 4/2002 | B01D 17/00 |
| WO | WO2003/072226 | 9/2003 | B01D 53/14 |
| WO | WO2004/070297 | 8/2004 | F25D 3/06 |
| WO | WO2009/140993 | 11/2009 | B01D 45/16 |
| WO | WO-2009140993 A1 * | 11/2009 | B01D 45/16 |
| WO | WO2013/136310 | 9/2013 | B01D 53/14 |
| WO | WO2014/042529 | 3/2014 | |
| WO | WO2014/094794 | 6/2014 | B01D 17/04 |
| WO | WO2014/106770 | 7/2014 | |
| WO | WO2015/013539 | 1/2015 | H04W 52/36 |
| WO | WO2015/105438 | 7/2015 | B01D 53/14 |
| WO | WO2015/167404 | 11/2015 | B01D 53/22 |
| WO | WO2016/064825 | 4/2016 | B01D 53/48 |

OTHER PUBLICATIONS

U.S. Appl. No. 62/548,171, filed Aug. 21, 2017, Denton, Robert D. et al.

U.S. Appl. No. 62/548,172, filed Aug. 21, 2017, Denton, Robert D. et al.

Carter, T. et al. (1998) "Addition of Static Mixers Increases Capacity in Central Texas Gas Plant," *Proc. of the 77th GPA Annual Conv.*, pp. 110-113.

Dow Chemical Company (Mar. 3, 2015) "Product Safety Assessment," *SELEXOL Solvents Product Brochure*, 3 pages.

Garrison, J. et al. (2002) "Keyspan Energy Canada Rimbey Acid Gas Enrichment with FLEXSORB SE PLUS Technology," *Proceedings 2002 Laurance Reid Gas Conditioning Conf.*, Norman, OK, 8 pgs.

Hanna, James M. (2009) "Qatargas Expansion Projects: Why Change the Gas Treating Concept from Sulfinol-D?," *OSGAT 2009 Proceedings 5th Int'l Conf.*, Mar. 31-Apr.1, Abu Dhabi, UAE, 33 pgs.

Jones, S. G. et al. (2004) "Design, Cost & Operation of an Acid Gas Enrichment & Injection Facility," *Proceedings 2004 Laurance Reid Gas Conditioning Conf.*, Norman, OK, 43 pgs.

Linga, H. et al. (2001) "New Selective $H_2S$ Removal Process for the Refining Industry," *Nat'l Petrochemical & Refiners Assoc.*, AM-01-35, 9 pgs.

Linga, H. et al. (2006) "Potentials and Applications for the Pro-Pure Co-Current Contactors," *13th Annual India Oil & Gas Rev. Symp.*, Mumbai, India, 24 pgs.

Nilsen, F. et al. (2001) "Selective $H_2S$ Removal in 50 Milliseconds," *Gas Processors Assoc., Europe Annual Conference*, 12 pgs.

Nilsen, F. et al. (2002) "Novel Contacting Technology Selectively Removes $H_2S$," *Oil & Gas Journal.*, 17 pgs.

Nilsen, F. et al. (2002) "Selective $H_2S$ Removal Applications using Novel Contacting Technology," *Gas Processors Assoc.*, 13 pgs.

Nova Molecular Technologies, Inc. (Jul. 17, 2008) "Product Brochure," *FLEXSORB SE*, 1 page.

ProSep, Inc. (2007) "Selective $H_2S$-Removal with Amines (ProCap)," *Product Brochure*, 32 pgs.

ProSep, Inc. (2014) "ProDry," *Gas Portfolio Product Brochure*, 1 pg.

ProSep, Inc. (2014) "ProScav," *Gas Portfolio Product Brochure*, 1 pg.

Puukilainen, E. et al. (2007) "Superhydrophobic Polyolefin Surfaces: Controlled Micro- an Nanostructures," *Dept. of Chemistry, Univ. of Joensuu*, Langmuir, v. 23, No. 13, pp. 7263-7268.

Royan, T. et al. (1992) "Acid Gas Enrichment using FLEXSORB," *Proceedings 1992 Laurance Reid Gas Conditioning Conf.*, Norman, OK, Mar. 2-4, 17 pgs.

Schutte & Koerting (2012) "Gas Scrubbers," *Product Brochure*, 14 pgs.

Smith, W. B. (2010) "Typical Amine and Glycol Treating Unit Compared to Gas Membrane Separation System for Wellhead $CO_2$ Trimming," *Laurance Reid Gas Conditioning Conf.*, Norman, OK, Feb. 21-24, 2010, pp. 417-436.

True, Warran R. (1994) "New Mobile Bay Complex Exploits Major Sour Gas Reserve," *Oil & Gas Journal*, v. 92, No. 21, 4 pgs.

Weiland, R. H. (2008) "Acid Gas Enrichment—Maximizing Selectivity," *Proceedings 2008 Laurance Reid Gas Conditioning Conf.*, Clarita, OK, 16 pgs.

\* cited by examiner

COALESCER FOR CO-CURRENT CONTACTORS

CROSS REFERENCE TO RELATED APPLICATIONS

This application is a divisional of U.S. patent application Ser. No. 15/009,936 filed Jan. 29, 2016, which claims the priority benefit of U.S. Patent Application 62/132,631 filed Mar. 13, 2015 entitled COALESCER FOR CO-CURRENT CONTACTORS, the entirety of which is incorporated by reference herein.

BACKGROUND

The production of hydrocarbons from a reservoir oftentimes carries with it the incidental production of non-hydrocarbon gases. Such gases include contaminants such as hydrogen sulfide ($H_2S$) and carbon dioxide ($CO_2$). When $H_2S$ or $CO_2$ are produced as part of a hydrocarbon stream (such as methane or ethane), the raw gas stream is sometimes referred to as "sour gas." The $H_2S$ and $CO_2$ are often referred to together as "acid gases."

In addition to hydrocarbon production streams, acid gases may be associated with synthesis gas streams, or with refinery gas streams. Acid gases may also be present within so-called flash-gas streams in gas processing facilities. Further, acid gases may be generated by the combustion of coal, natural gas, or other carbonaceous fuels.

Gas and/or hydrocarbon fluid streams may contain not only $H_2S$ or $CO_2$, but may also contain other "acidic" impurities. These include mercaptans and other trace sulfur compounds ($SO_x$). In addition, natural gas streams may contain water. Indeed, water is the most common contaminant in many natural gas streams. Such impurities should be removed prior to industrial or residential use.

Processes have been devised to remove contaminants from a raw natural gas stream. In the case of acid gases, cryogenic gas processing is sometimes used, particularly to remove $CO_2$ to prevent line freezing and plugged orifices. In other instances, particularly with $H_2S$ removal, the hydrocarbon fluid stream is treated with a solvent. Solvents may include chemical solvents such as amines. Examples of amines used in sour gas treatment include monoethanol amine (MEA), diethanol amine (DEA), and methyl diethanol amine (MDEA).

Physical solvents are sometimes used in lieu of amine solvents. Examples include physical solvents currently marketed under the brand names Selexol® (comprising dimethyl ethers of polyethylene glycol) and Rectisol™ (comprising methanol). In some instances hybrid solvents, meaning mixtures of physical and chemical solvents, have been used. An example of one such hybrid solvent is currently marketed under the brand name Sulfinol® (comprising sulfolane, water, and one or more amines). However, the use of amine-based acid gas removal solvents is most common.

Amine-based solvents rely on a chemical reaction with the acid gases. The reaction process is sometimes referred to as "gas sweetening." Such chemical reactions are generally more effective than the physical-based solvents, particularly at feed gas pressures below about 300 pounds per square inch absolute (psia) (about 20 bar). There are instances where special chemical solvents such as Flexsorb® (comprising hindered amine) are used, particularly for selectively removing $H_2S$ from $H_2S$ and $CO_2$-containing gas and/or hydrocarbon fluid streams.

As a result of the gas sweetening process, a treated or "sweetened" gas stream is created. The sweetened gas stream is substantially depleted of $H_2S$ and/or $CO_2$ components. The sweetened gas can be further processed for liquids recovery, that is, by condensing out heavier hydrocarbon gases. The sweet gas may be sold into a pipeline or may be used for liquefied natural gas (LNG) feed. In addition, the sweetened gas stream may be used as feedstock for a gas-to-liquids process, and then ultimately used to make waxes, butanes, lubricants, glycols and other petroleum-based products. The extracted $CO_2$ may be sold, or it may be injected into a subterranean reservoir for enhanced oil recovery operations.

When a natural gas stream contains water, a dehydration process is usually undertaken before or after acid gas removal. This is done through the use of glycol or other desiccant in a water separator. The dehydration of natural gas is done to control the formation of gas hydrates and to prevent corrosion in distribution pipelines. The formation of gas hydrates and corrosion in pipelines can cause a decrease in flow volume as well as frozen control valves, plugged orifices and other operating problems.

Traditionally, the removal of acid gases or water using chemical solvents or desiccants involves counter-currently contacting the raw natural gas stream with the chemical. The raw gas stream is introduced into the bottom section of a contacting tower, or absorption tower. At the same time, the solvent solution is directed into a top section of the tower. The tower has trays, packing, or other "internals." As the solvent cascades through the internals, it absorbs the undesirable components, carrying them away through the bottom of the contacting tower as part of a "rich" solvent solution. At the same time, gaseous fluid that is largely depleted of the undesirable components exits at the top of the tower.

The rich solvent or rich glycol, as the case may be, that exits the contactor is sometimes referred to as an absorbent liquid. Following absorption, a process of regeneration (also called "desorption") may be employed to separate contaminants from the active solvent of the absorbent liquid. This produces a "lean" solvent or a "lean" glycol that is then typically recycled into the contacting tower for further absorption.

While perhaps capable of performing desired contacting for removal of contaminants from a gas and/or hydrocarbon-containing fluid stream, historic contactor designs have had difficulty scaling-up from lab and/or pilot-sized units to units capable of efficiently processing up to a billion standard cubic feet per day (BSFD) of gas. Past scale-up designs have high capital expenses (e.g., due to having larger and more pieces of equipment, more complicated transportation and installation, etc.) and high operational expenses (e.g., due to less reliability and/or operability, larger size and weight equipment, etc.). Consequently, a need exists for a contacting designs that is smaller, has fewer pieces of equipment, has improved operability and reliability, is easier to transport and install, and weighs less than traditional contacting equipment.

SUMMARY OF THE INVENTION

The disclosure includes a method, comprising passing a fluid into a co-current contactor, passing a solvent into the co-current contactor, dividing the solvent into solvent droplets having a first average droplet size, placing the fluid in contact with the solvent droplets to create a combined stream, coalescing at least a portion of the solvent droplets to create solvent droplets having a second average droplet size, wherein the second average droplet size is greater than the first average droplet size, and separating the fluid and the solvent.

The disclosure includes a co-current contactor apparatus, comprising a first inlet configured to receive a first fluid stream proximate to a first end of the co-current contactor, a second inlet configured to receive a second fluid stream proximate to the first end of the co-current contactor, an inlet section configured to atomize at least a portion of the second fluid stream, a mass transfer section configured to receive the first fluid stream and the atomized second fluid stream, and to pass the atomized second fluid stream and the the first fluid stream as a combined stream, a coalescer configured receive the combined stream, and to increase an average droplet size of the atomized second fluid stream, and a separator configured to separate at least a portion of the atomized second fluid stream from the combined stream.

The disclosure includes a co-current contacting system, comprising a plurality of co-current contactors coupled in a counter-current configuration, wherein each co-current contactor comprises a first inlet configured to receive a first fluid stream proximate to a first end of the co-current contactor, a second inlet configured to receive a second fluid stream proximate to the first end of the co-current contactor, an inlet section configured to atomize at least a portion of the second fluid stream, a mass transfer section configured to receive the first fluid stream and the atomized second fluid stream, and to pass the atomized second fluid stream and the the first fluid stream as a combined stream, a coalescer configured to receive the combined stream, and to increase the average droplet size of the atomized second fluid stream, and a separator configured to separate at least a portion of the atomized second fluid stream from the combined stream.

It is understood that the methods above may be used to remove a contaminant, e.g., an acid gas component, a water component, etc., from other fluid streams. These separated fluid streams may include, for example, a sour water stream, a flash-gas stream, or a Claus tail gas stream.

DESCRIPTION OF THE DRAWINGS

So that the manner in which the present invention can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION

Figure 1A:
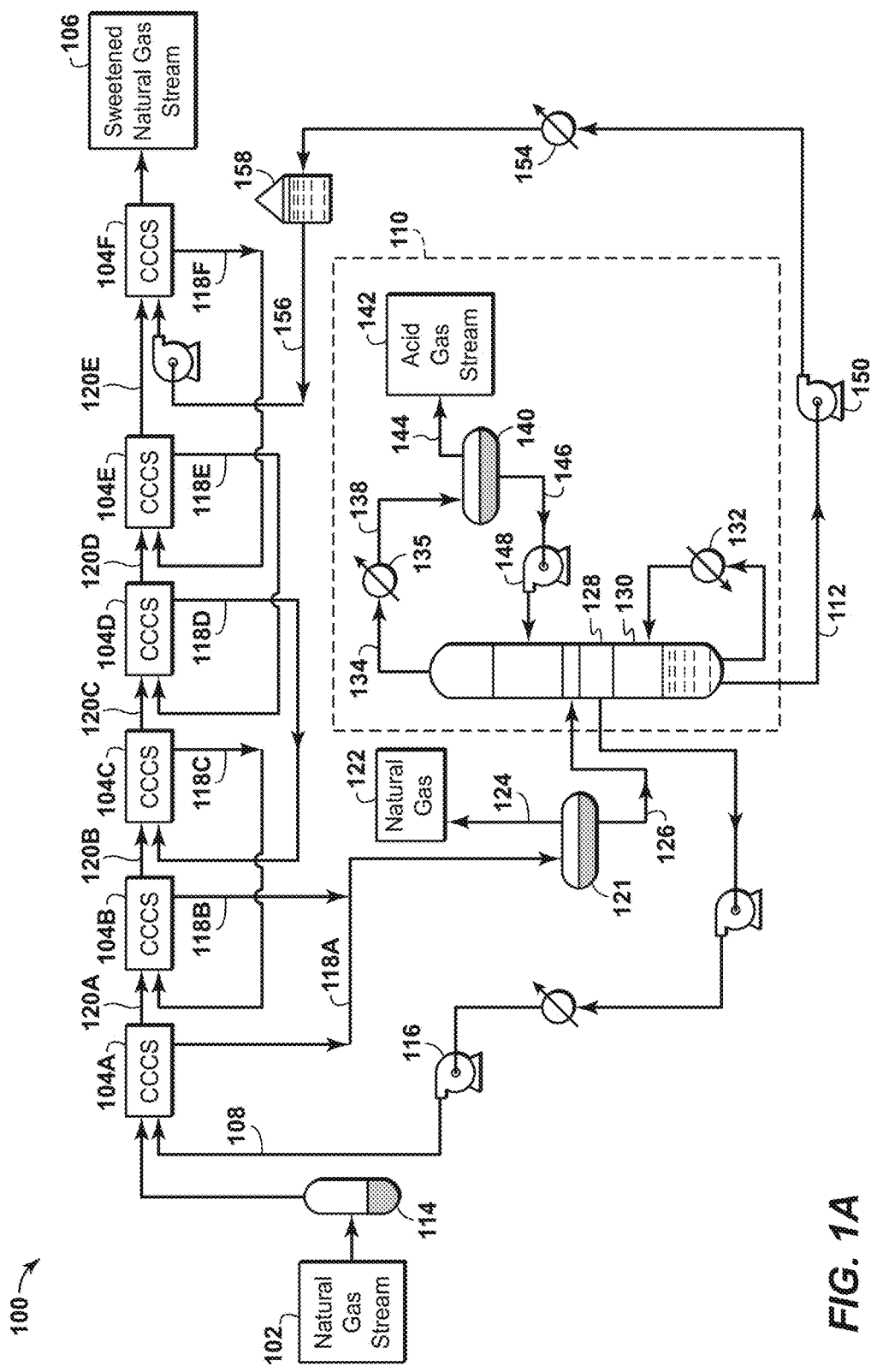
FIG. 1A is a process flow diagram of a gas processing system that includes a co-current flow scheme.

As used herein, an "acid gas" means any gas that dissolves in water producing an acidic solution. Non-limiting examples of acid gases include hydrogen sulfide ($H_2S$), carbon dioxide ($CO_2$), sulfur dioxide ($SO_2$), carbon disulfide ($CS_2$), carbonyl sulfide (COS), mercaptans, or mixtures thereof.

As used herein, the term "atomize" means to divide, reduce, or otherwise convert a liquid into minute particles, a mist, or a fine spray of droplets having an average droplet size within a predetermined range.

As used herein, the term "co-current contacting device" or "co-current contactor" means an apparatus, e.g., a pipe, a vessel, a housing, an assembly, etc., that receives (i) a stream of gas (or other fluid stream to be treated) and (ii) a separate stream of solvent (or other fluid treating solution) in such a manner that the gas stream and the solvent stream contact one another while flowing in generally the same direction within the contacting device.

As used herein, the term "contaminant" means an acid gas, water, another undesirable component, or a combination thereof absorbable by a selected solvent.

As used herein, the term "flue gas" means any gas stream generated as a by-product of hydrocarbon combustion.

As used herein, the term "fluid" refers to gases, liquids, and combinations of gases and liquids, as well as to combinations of gases and solids, and combinations of liquids and solids.

As used herein, the term "hydrocarbon" refers to an organic compound that includes primarily, if not exclusively, the elements hydrogen and carbon. Hydrocarbons generally fall into two classes: aliphatic, or straight chain hydrocarbons, and cyclic, or closed ring, hydrocarbons including cyclic terpenes. Examples of hydrocarbon-containing materials include any form of natural gas, oil, coal, and bitumen that can be used as a fuel or upgraded into a fuel.

As used herein, the term "industrial plant" refers to any plant that generates a stream containing at least one hydrocarbon or an acid gas. One non-limiting example is a coal-powered electrical generation plant. Another example is a cement plant that emits $CO_2$ at low pressures.

With respect to fluid processing equipment, the term "inline" may mean that two or more items are placed along a flow line such that a fluid stream undergoing fluid separation moves from one item of equipment to the next while maintaining flow in a substantially constant downstream direction, and/or that the two or more items are connected sequentially or, more preferably, are integrated into a single tubular device.

As used herein, the terms "lean" and "rich," with respect to the absorbent liquid removal of a selected gas component from a gas stream, are relative, merely implying, respectively, a lesser or greater degree of content of the selected gas component. The respective terms "lean" and "rich" do not necessarily indicate or require, respectively, either that an absorbent liquid is totally devoid of the selected gaseous component, or that it is incapable of absorbing more of the selected gas component. In fact, it is preferred, as will be evident hereinafter, that the so called "rich" absorbent liquid produced in a first contactor in a series of two or more contactors retains significant or substantial residual absorptive capacity. Conversely, a "lean" absorbent liquid will be understood to be capable of substantial absorption, but may retain a minor concentration of the gas component being removed.

As used herein, the term "natural gas" refers to a multi-component gas obtained from a crude oil well (associated gas) or from a subterranean gas-bearing formation (non-associated gas). The composition and pressure of natural gas can vary significantly. A typical natural gas stream contains methane ($C_1$) as a significant component. The natural gas stream may also contain ethane ($C_2$), higher molecular weight hydrocarbons, one or more acid gases, and water.

The natural gas may also contain minor amounts of contaminants such as nitrogen, iron sulfide, and wax.

As used herein, the term "non-absorbing gas" means a gas that is not absorbed by a solvent during a gas treating or conditioning process, e.g., during co-current contacting.

As used herein, the term "solvent" means a liquid phase fluid or a multiphase fluid (a fluid comprising both a liquid and gas phase) that preferentially absorbs one or more component over other components. For example, a solvent may preferentially absorb a contaminant, e.g., acid gas, thereby removing or "scrubbing" at least a portion of the contaminant from a contaminated stream, e.g., a contaminated natural gas stream.

As used herein, the term "sweetened gas stream" refers to a fluid stream in a substantially gaseous phase that has had at least a portion of acid gas components removed. Further, the term "sweetened" may also refer to a fluid stream that has been subjected to a dehydration or other conditioning process.

DESCRIPTION OF SPECIFIC EMBODIMENTS

FIG. 1A is a process flow diagram of a gas processing system 100 that includes a co-current flow scheme arranged in a counter current configuration. The gas processing system 100 may be used for the removal of $H_2S$ or other acid gas components from a gas stream 102. In addition, in some embodiments, the gas processing system 100 may be used for the removal of water or other impurities from the gas stream 102.

The gas processing system 100 may employ a number of vertically oriented co-current contacting systems 104A-F. In some embodiments, each vertically oriented co-current contacting system 104A-F includes vertically oriented co-current contactor upstream of a separation system. In other embodiments, each vertically oriented co-current contacting system 104A-F includes a number of vertically oriented co-current contactors upstream of a single separation system. As would be apparent to those of skill in the art, any or all of the co-current contacting systems 104A-F may be either vertically oriented or horizontally oriented, depending on the details of the specific implementation, and such alternate embodiments are within the scope of this disclosure.

The gas stream 102 may be a natural gas stream from a hydrocarbon production operation. For example, the gas stream 102 may be a flue gas stream from a power plant, or a synthesis gas (syn-gas) stream. If the natural gas stream 102 is a syn-gas stream, the gas stream 102 may be cooled and filtered before being introduced into the gas processing system 100. The gas stream 102 may also be a flash gas stream taken from a flash drum in a gas processing system itself. In addition, the gas stream 102 may be a tail gas stream from a Claus sulfur recovery process or an impurities stream from a regenerator. Furthermore, the gas stream 102 may be an exhaust emission from a cement plant or other industrial plant. In this instance, $CO_2$ may be absorbed from excess air or from a nitrogen-containing flue gas.

The gas stream 102 may include a non-absorbing gas, such as methane, and one or more impurities, such as an acid gas. For example, the gas stream 102 may include $CO_2$ or $H_2S$. The gas processing system 100 may convert the gas stream 102 into a sweetened gas stream 106 by removing the acid gases.

In operation, the gas stream 102 may be flowed into a first co-current contacting system 104A, where it is mixed with a solvent stream 108. If the gas processing system 100 is to be used for the removal of $H_2S$, or other sulfur compounds, the solvent stream 108 may include an amine solution, such as monoethanol amine (MEA), diethanol amine (DEA), or methyldiethanol amine (MDEA). Other solvents, such as physical solvents, alkaline salts solutions, or ionic liquids, may also be used for $H_2S$ removal. In embodiments used for other purposes, such as dehydration or reactions, other solvents or reactants, such as glycols, may be used. The solvent stream 108 may include a lean solvent that has undergone a desorption process for the removal of acid gas impurities. For example, in the gas processing system 100 shown in FIG. 1A, the solvent stream 108 introduced into the first co-current contacting system 104A includes a semi-lean solvent that is taken from a central portion of a regenerator 110. A lean solvent stream 112 taken from the regenerator 110 may also be directed into a final co-current contacting system 104F.

In various embodiments, the gas processing system 100 employs a series of co-current contacting systems 104A-F. In some embodiments, as shown in FIG. 1A, the co-current contacting systems 104A-F may be arranged in a counter current configuration. Each co-current contacting system 104A-F removes a portion of the acid gas content from the natural gas stream 102, thereby releasing a progressively sweetened natural gas stream in a downstream direction. The final co-current contacting system 104F provides the final sweetened natural gas stream 106.

Before entering the first co-current contacting system 104A, the natural gas stream 102 may pass through an inlet separator 114. The inlet separator 114 may be used to clean the natural gas stream 102 by filtering out impurities, such as brine and drilling fluids. Some particle filtration may also take place. The cleaning of the natural gas stream 102 can prevent foaming of solvent during the acid gas treatment process.

As shown in FIG. 1A, the solvent stream 108 is flowed into the first co-current contacting system 104A. Movement of the semi-lean solvent stream 108 into the first co-current contacting system 104A may be aided by a pump 116. The pump 116 may cause the semi-lean solvent stream 108 to flow into the first co-current contacting system 104A at a suitable pressure, for example, of about 15 psig to about 1,500 psig.

Once inside the first co-current contacting system 104A, the natural gas stream 102 and the solvent stream 108 move along the longitudinal axis of the first co-current contacting system 104A. As they travel, the solvent stream 108 interacts with the $H_2S$, $H_2O$, and/or other impurities in the natural gas stream 102, causing the $H_2S$, $H_2O$, and/or other impurities to chemically attach to or be absorbed by the amine molecules. A first partially-loaded, or "rich," gas solvent or treating solution 118A may be flowed out of the first co-current contacting system 104A. In addition, a first partially-sweetened natural gas stream 120A may be flowed out of the first co-current contacting system 104A and into a second co-current contacting system 104B. This general arrangement may be referred to as arranging co-current contactors in a counter current configuration.

As shown in the example illustrated in FIG. 1A, a third co-current contacting system 104C may be provided after the second co-current contacting system 104B, and a fourth co-current contacting system 104D may be provided after the third co-current contacting system 104C. In addition, a fifth co-current contacting system 104E may be provided after the fourth co-current contacting system 104D, and a final co-current contacting system 104F may be provided after the fifth co-current contacting system 104E. Each of the second, third, fourth, and fifth co-current contacting systems 104B, 104C, 104D, and 104E may generate a respective partially-sweetened natural gas stream 120B, 120C, 120D, and 120E. In addition, each of the second, third, fourth, fifth, and final co-current contacting systems 104B, 104C, 104D, 104E, and 104F may generate respective partially-loaded gas treating solution 118B, 118C, 11D, 118E, and 118F. If an amine is used as the solvent stream 108, the partially-loaded gas treating solutions 118A-F may include rich amine solutions. In the gas processing system 100, the second loaded gas treating solution 118B merges with the rich gas treating solution 118A and goes through a regeneration process in the regenerator 110.

As the progressively-sweetened natural gas streams 120A-E are generated, the gas pressure in the gas processing system 100 will gradually decrease. As this occurs, the liquid pressure of the progressively-richer gas treating solutions 118A-F may be correspondingly increased. This may be accomplished by placing one or more booster pumps (not shown) between each co-current contacting system 104A-F to boost liquid pressure in the gas processing system 100.

In the gas processing system 100, solvent streams may be regenerated by flowing the partially-loaded gas treating solutions 118A and 118B through a flash drum 121. Absorbed natural gas 122 may be flashed from the partially-loaded gas treating solutions 118A and 118B within the flash drum 121, and may be flowed out of the flash drum 121 via an overhead line 124.

The resulting rich solvent stream 126 may be flowed from the flash drum 121 to the regenerator 110. The rich solvent stream 126 may be introduced into the regenerator 110 for desorption. The regenerator 110 may include a stripper portion 128 including trays or other internals (not shown). The stripper portion 128 may be located directly above a heating portion 130. A heat source 132 may be provided with the heating portion 130 to generate heat. The regenerator 110 produces the regenerated, lean solvent stream 112 that is recycled for re-use in the final co-current contacting system 104F. Stripped overhead gas from the regenerator 110, which may include concentrated $H_2S$ (or $CO_2$), may be flowed out of the regenerator 110 as an overhead impurities stream 134.

The overhead impurities stream 134 may be flowed into a condenser 135, which may cool the overhead impurities stream 134. The resulting cooled impurities stream 138 may be flowed through a reflux accumulator 140. The reflux accumulator 140 may separate any remaining liquid, such as condensed water, from the impurities stream 138. This may result in the generation of a substantially pure acid gas stream 142, which may be flowed out of the reflux accumulator 140 via an overhead line 144.

In some embodiments, if the initial natural gas stream 102 includes $CO_2$, and a $CO_2$-selective solvent stream 108 is used, the acid gas stream 142 includes primarily $CO_2$. The $CO_2$-rich acid gas stream 142 may be used as part of a miscible EOR operation to recover oil. If the oil reservoir to be flooded does not contain a significant amount of $H_2S$ or other sulfur compounds, the $CO_2$ to be used for the EOR operation may not contain significant $H_2S$ or other sulfur compounds. However, concentrated $CO_2$ streams from oil and gas production operations may be contaminated with small amounts of $H_2S$. Thus, it may be desirable to remove the $H_2S$ from the $CO_2$, unless the acid gas stream 142 is to be injected purely for geologic sequestration.

While a gas stream 102 is discussed herein, those of skill in the art will appreciate that generally the same principles may be applied to any fluid stream, including with respect to liquid-liquid contacting. Consequently, use of the phrases "gas stream," "gas inlet," "gas outlet," etc. are to be understood as non-limiting and may optionally be replaced with "fluid stream," "fluid inlet," "fluid outlet," and so forth in various embodiments within the scope of this disclosure. Use of the phrases "gas stream," "gas inlet," "gas outlet," etc. are for the sake of convenience only.

In some embodiments, if the initial natural gas stream 102 includes $H_2S$, an $H_2S$-selective solvent stream 108 may be used to capture the $H_2S$. The $H_2S$ may then be converted into elemental sulfur using a sulfur recovery unit (not shown). The sulfur recovery unit may be a so-called Claus unit. Those of ordinary skill in the art will understand that a "Claus process" is a process that is sometimes used by the natural gas and refinery industries to recover elemental sulfur from $H_2S$-containing gas streams.

In practice, the "tail gas" from the Claus process, which may include $H_2S$, $SO_2$, $CO_2$, $N_2$, and water vapor, can be reacted to convert the $SO_2$ to $H_2S$ via hydrogenation. The hydrogenated tail gas stream has a high partial pressure, a large amount of $CO_2$, e.g., more than 50%, and a small amount of $H_2S$, e.g., a few percent or less. This type of gas stream, which is typically near atmospheric pressure, is amenable to selective $H_2S$ removal. The recovered $H_2S$ may be recycled to the front of the Claus unit, or may be sequestered downstream. Alternatively, a direct oxidation of the $H_2S$ to elemental sulfur may be performed using various processes known in the field of gas separation.

As shown in FIG. 1A, a residual liquid stream 146 may be flowed out of the bottom of the reflux accumulator 140. The residual liquid stream 146 may be flowed through a reflux pump 148, which may boost the pressure of the residual liquid stream 146 and pump the residual liquid stream 146 into the regenerator 110. The residual liquid stream 146 may be flowed out of the regenerator 110, for example, from the bottom of the heating portion 130 as part of the lean solvent stream 112. Some water may be added to the lean solvent stream 112 to balance the loss of water vapor to the partially sweetened natural gas streams 120A-E. This water may be added at an intake or suction of the reflux pump 148.

The lean solvent stream 112 may be at a low pressure. Accordingly, the lean solvent stream 112 may be passed through a pressure boosting pump 150. From the pressure boosting pump 150, the lean solvent stream 112 may be flowed through a cooler 154. The cooler 154 may cool the lean solvent stream 112 to ensure that the lean solvent stream 112 will absorb acid gases effectively. The resulting cooled lean solvent stream 156 is then used as the solvent stream for the final co-current contacting system 104F.

In some embodiments, a solvent tank 158 is provided proximate the final co-current contacting system 104F. The cooled lean solvent stream 156 may be flowed from the solvent tank 158. In other embodiments, the solvent tank 158 is off-line and provides a reservoir for the lean solvent stream 156.

The process flow diagram of FIG. 1A is not intended to indicate that the gas processing system 100 is to include all of the components shown in FIG. 1A. Further, any number of additional components may be included within the gas processing system 100, depending on the details of the specific implementation. For example, the gas processing system 100 may include any suitable types of heaters, coolers, condensers, liquid pumps, gas compressors, blowers, bypass lines, other types of separation and/or fractionation equipment, valves, switches, controllers, and pressuremeasuring devices, temperature-measuring devices, level-measuring devices, or flow-measuring devices, among others.

Figure 1B:
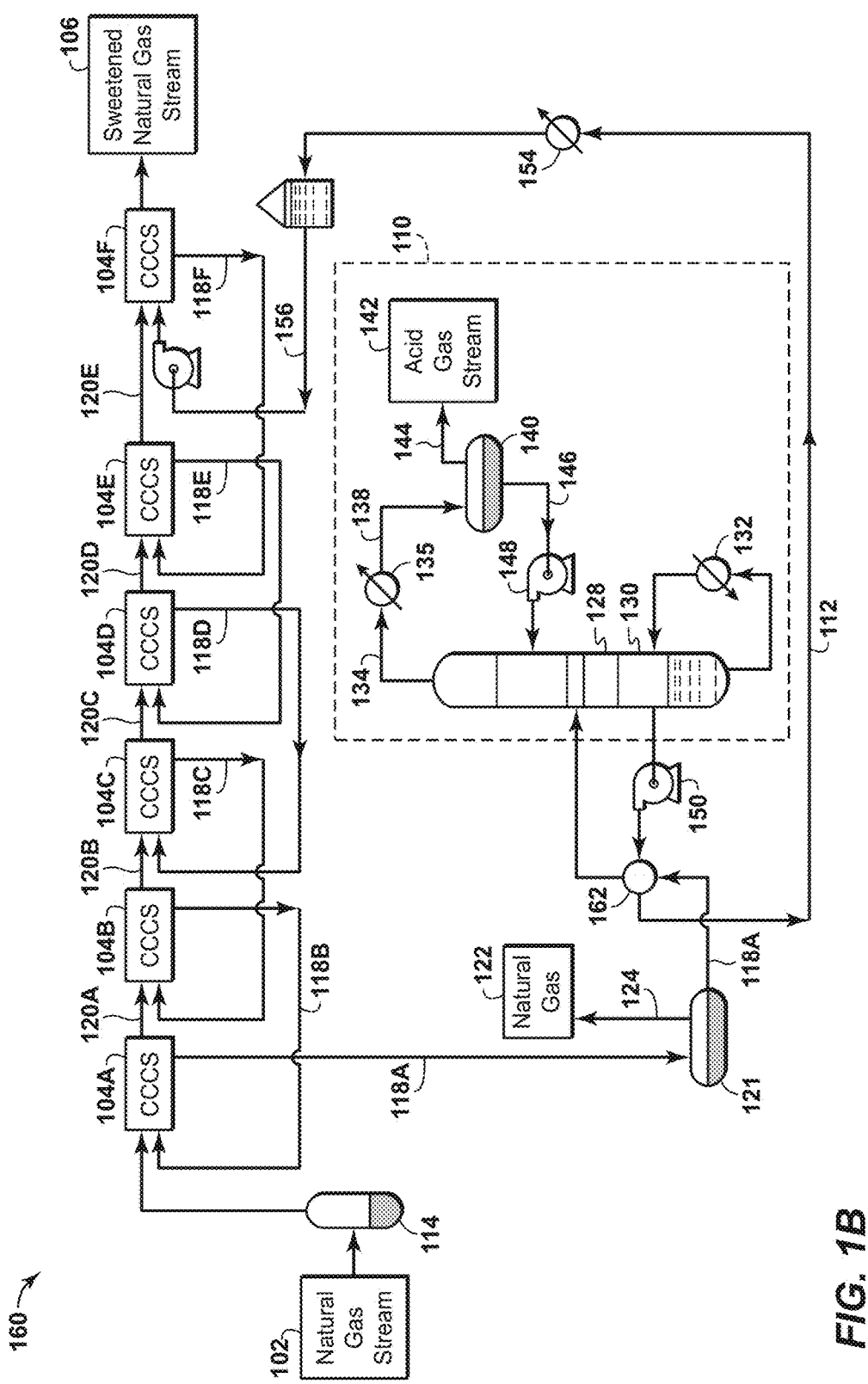
FIG. 1B is a process flow diagram of another gas processing system that includes a co-current flow scheme.

FIG. 1B is a process flow diagram of another gas processing system 160 that includes a co-current flow scheme. Like numbered items are as described with respect to FIG. 1A. Operation of the gas processing system 160 of FIG. 1B is similar to that of the gas processing system 100 of FIG. 1A. However, in the gas processing system 160, the first co-current contacting system 104A receives the partially-loaded gas treating solution 118B from the second co-current contacting system 104B. Therefore, the gas processing system 160 does not include the semi-lean solvent stream 108. In this example, the series of co-current contacting systems 104A-F acts like a separation column, for example, wherein each stage corresponds to a packed stage.

Because the partially-loaded gas treating solution 118B received by the first co-current contacting system 104A in FIG. 1B has already been processed through the second co-current contacting system 104B, the partially-loaded gas treating solution 118B may be very rich. For this reason, it may be desirable to provide some level of intermediate processing of the partially-loaded gas treating solution 118B.

Alternatively, a semi-lean liquid stream could be taken from other sweetening operations in the gas processing system 160 and used, at least in part, as an amine solution for the first or second co-current contacting system 104A or 104B. In this respect, there are situations in which a single type of solvent is used for more than one service in the gas processing system 160. This is referred to as integrated gas treatment. For example, MDEA may be used both for high-pressure, $H_2S$-selective acid gas removal, as well as in a Claus tail gas treating (TGT) process. The rich amine stream from the TGT process is not heavily loaded with $H_2S$ and $CO_2$, owing to the low pressure of the process. Thus, in some embodiments, the rich amine stream from the TGT process is used as a semi-lean stream for the first or second co-current contacting system 104A or 104B. The semi-lean stream (not shown) may be pumped to a suitable pressure and injected into the first or second co-current contacting system 104A or 104B, possibly along with the partially-loaded gas treating solution from the succeeding co-current contacting system.

Further, in the gas processing system 160 of FIG. 1B, the first partially-loaded treating solution 118A is flowed through a heat exchanger 162 after being flowed through the flash drum 121. Within the heat exchanger 162, the temperature of the first partially-loaded treating solution 118A is increased via heat exchange with the lean solvent 112 taken from the regenerator 110. This serves to heat the first partially-loaded treating solution 118A before introduction into the regenerator 110, while cooling the lean solvent stream 112.

The process flow diagram of FIG. 1B is not intended to indicate that the gas processing system 160 is to include all of the components shown in FIG. 1B. Further, any number of additional components may be included within the gas processing system 160, depending on the details of the specific implementation.

Figure 2:
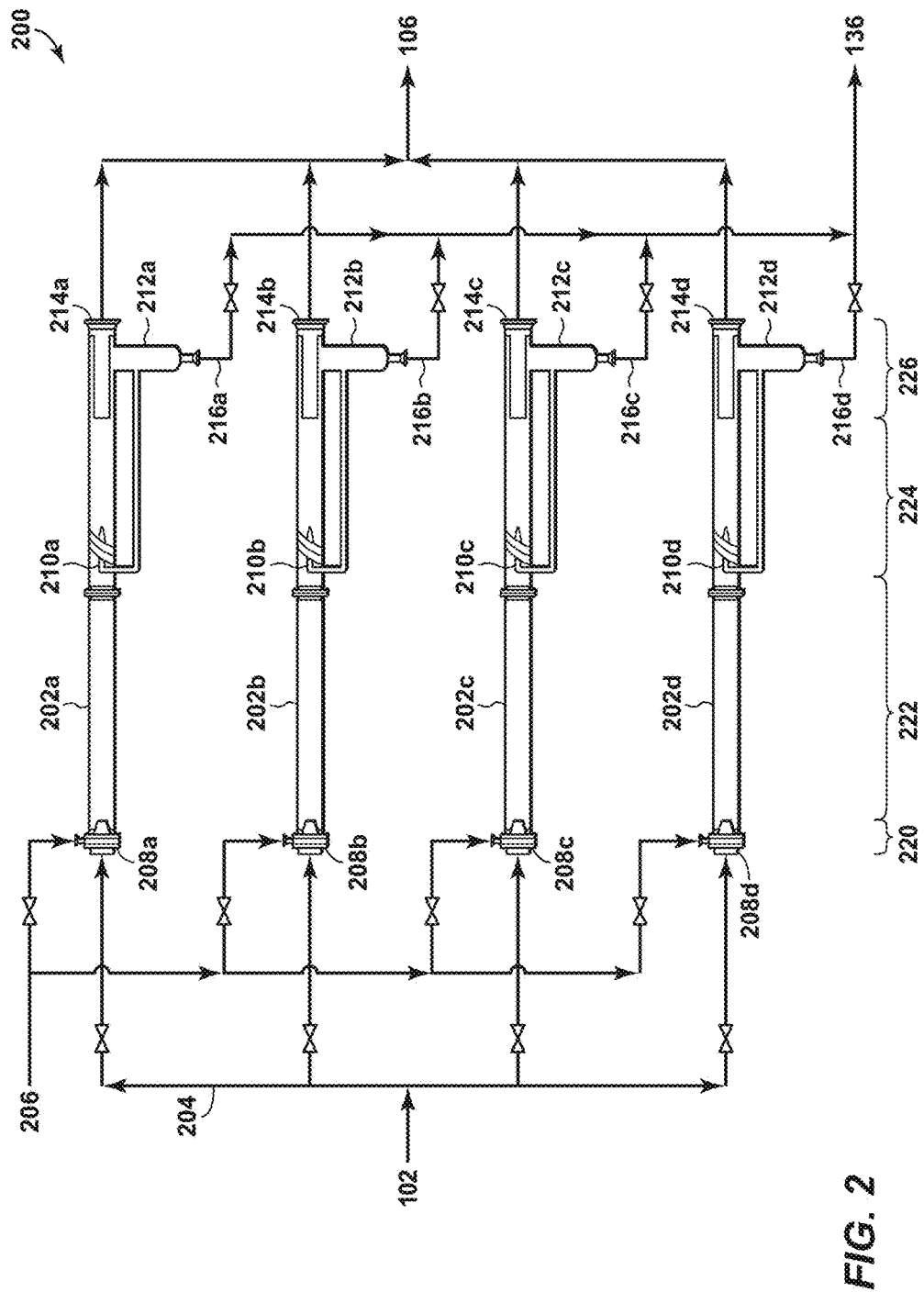
FIG. 2 is a schematic diagram of a co-current contacting system comprising multiple co-current contactors.

FIG. 2 is a schematic diagram of a co-current contacting system 200, e.g., any one of the co-current contacting systems 104A-F of FIG. 1. The components of FIG. 2 may be the substantially the same as the corresponding components of FIG. 1 except as otherwise noted. The co-current contacting system 200 has four contacting units 202a-202d separately supplied by a header 204 for a natural gas stream 102. The contacting units 202a-202d are separately supplied by a header carrying a lean solvent stream 206, e.g., a semi-lean solvent stream 108 or any of the partially-loaded gas treating solutions 118A-F. and received proximate to a first end of each each contacting unit 202a-202d. Each contacting unit 202a-202d has an inlet nozzle 208a-208d (respectively) for atomizing and/or dividing the solvent into a large number of small droplets and introducing the lean solvent stream 206. Atomizing the lean solvent stream 206 increases the surface area available for contact with the natural gas stream 102 and decreases the distances required for diffusion of acid gas components in both the vapor and liquid phases. Each contacting unit 202a-202d has a recycle gas inlet 210a-210d supplied by gas collected and returned from a seal pot or liquid boot 212a-212d. As depicted, each recycle gas inlet 210a-210d may include a swirl vane or equivalent structure to assist in separation. The seal pot or liquid boot 212a-212d may provide residence time for process control and may seal the contacting units 202a-202d to prevent gas bypass. Each contacting unit 202a-202d has a treated gas outlet 214a-214d and a rich solvent outlet 216a-216d. The treated gas outlets 214a-214d are depicted as comprising vortex tube finders, but alternate embodiments are well known in the art. Treated gas exiting the contacting units 202a-202d via the treated gas outlets 214a-214d may be combined and passed as the sweetened gas stream 106, while rich solvent exiting the contacting units 202a-202d via the rich solvent outlets 216a-216d may be combined and passed as the rich solvent stream 136.

In operation, each contacting unit 202a-202d receives a natural gas stream 102 at an inlet section 220a-220d, where the inlet nozzles 208a-208d atomize a lean solvent stream 206 and expose it to the natural gas stream 102, creating a mixed, two-phase flow or combined stream (not depicted). The mixed, two-phase flow or combined stream passes through a mass transfer section 222 where absorption occurs. The mass transfer section 222 may comprise a tubular body having a substantially empty bore having one or more surface features, e.g., a hydrophobic surface, a superhydrophobic surface, a raised surface, a recessed surface, or any combination thereof, along an inner surface of the mass transfer section 222. A separation section 224 follows the mass transfer section. In the separation section 224, entrained liquid droplets are removed from the gas stream. e.g., using a cyclone inducing element, resulting in an at least partially dehydrated and/or decontaminated treated gas stream. In some embodiments, the inlet section 220 and the mass transfer section 222 may collectively be referred to as a contacting section. The length of the contacting section may be determined based on the residence time required to obtain a predetermined decontamination and/or dehydration level for the natural gas stream 102. e.g., in view of the intended flow rate, pressure drop, etc. The treated gas stream exits the contacting units 202a-202d through the outlet section 226. The contacting units 202a-202d may operate at about 400 psig to about 1,200 psig, or higher. Because the contacting units 202a-202d must be individually constructed so as to tolerate these pressures, weight and/or footprint increases linearly as the number of contacting units 202a-202d is increased.

As co-current contactors become more compact, both in length and diameter, it is important to ensure as much solvent as possible reacts in the increasingly shortened mixing and/or mass transfer section. The $H_2S$ reaction is instantaneous relative to the $CO_2$ reactions, lowering the residence time, i.e., the contact time between the vapor and liquid phases, will result in less $CO_2$ being absorbed into the solvent. The design of the co-current contacting systems 104A-F enhances selective $H_2S$ removal due to the short contact time inherent in the equipment design. Disclosed herein are techniques for inhibiting or impeding an amount of liquid from propagating along a wall of the mass transfer section using a surface feature. By inhibiting or impeding liquid propagation along a wall of the mass transfer section, a comparatively greater amount of solvent is retained in the interior volume of the mass transfer section and, consequently, remains available for reaction.

Figure 3:
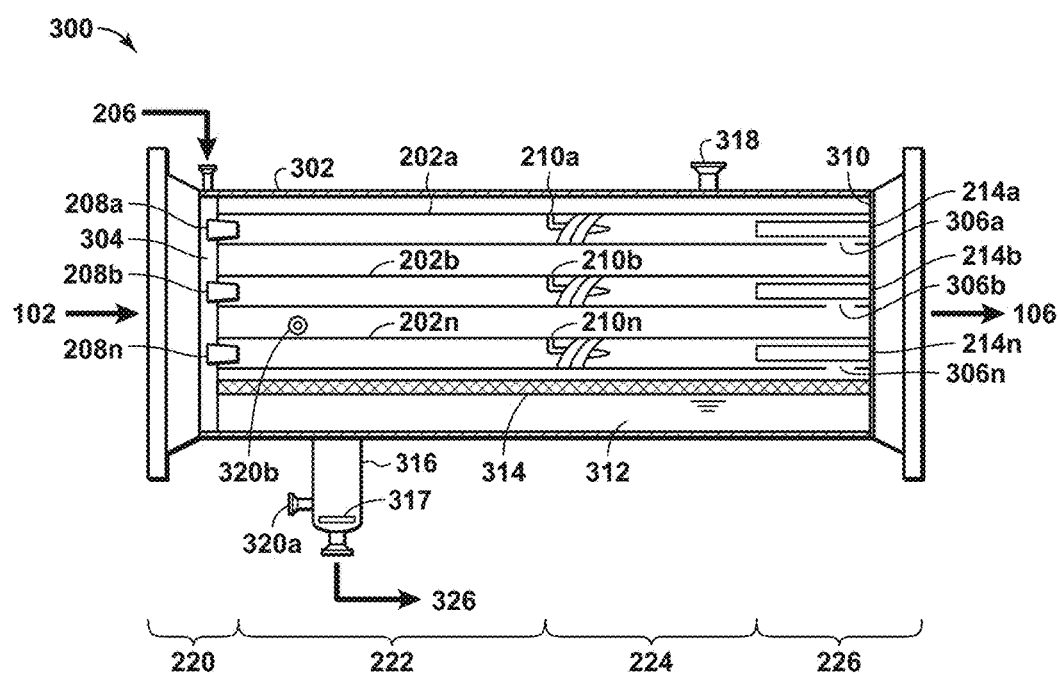
FIG. 3 is a side view of an embodiment of a single stage multiple co-current contactor bundle configuration.

FIG. 3 is a side view of an embodiment of a single stage multiple co-current contactor bundle configuration 300. The components of FIG. 3 are substantially the same as the corresponding components of FIG. 2 except as otherwise noted. The single stage multiple co-current contactor bundle configuration 300 is generally contained within a vessel 302 which may form a unitary (single and/or common) pressure boundary for the compact contacting occurring therein. The vessel 302 generally contains a single stage bundle of substantially parallel separation units or compact contactors comprising contacting units 202a-202n, also referred to herein as separation units. Those of skill in the art will understand that the number of contacting units 202a-202n in the bundle of compact contactors may be optionally selected based on the desired design characteristics, including desired flow rate, separation unit diameter, etc., and could number from anywhere between one to 300 or more units. The use of the letter nomenclature (i.e., 'a', 'b', 'n', etc.) in conjunction with the numerical reference characters is for ease of reference only and is not limiting. For example, those of skill in the art will understand that an illustrated set of contacting units 202a-202n may, in various embodiments, comprise two, four, five, twenty, or several hundred contacting units. The vessel 302 comprises an inlet tubesheet 304 having inlet nozzles 208a-208n in the inlet section 220. The inlet section 220 is configured to receive the natural gas stream 102 in a common inlet plenum through which the natural gas stream 102 may be distributed substantially equally across the contacting units 202a-202n. The contacting units 202a-202n may be of a suitable size depending on the design requirements. For example, the contacting units 202a-202n may have an individual diameter from about 2 inches (in) (about 5 centimeters (cm)) to about 24 in (about 61 cm), or any range there between. The inlet tubesheet 304 is configured to receive the lean solvent stream 206 and pass the lean solvent stream 206 to the inlet nozzles 208a-208n, where the lean solvent stream 206 may be atomized. In some embodiments, the lean solvent stream 206 originates from a glycol supply system (not depicted) and the lean solvent stream 206 comprises glycol. The inlet nozzles 208a-208n may serve to entrain the atomized solvent stream in the natural gas stream 102, and the mixed stream of atomized solvent and natural gas may be passed to the mass transfer section 222 where absorption occurs. Each contacting unit 202a-202n has a recycle gas inlet 210a-210n supplied by recycle gas collected and returned, e.g., from a common boot 316. The boot 316 may be optionally included in low liquid rate applications to improve liquid rate flow control. As depicted, the boot 316 may have an internal vortex breaker 317 or other appropriate internals. For ease of viewing, the recycle gas supply lines for each of the recycle gas inlets 210a-210n are not depicted. As will be understood by those of skill in the art, the recycle gas inlets 210a-210n are optional, and recycle gas may additionally or alternatively be sent downstream in other embodiments. Rich solvent exiting the contacting units 202a-202n via the rich solvent outlets 306a-306n may drain into a common liquid degassing section or common contaminated liquid collection plenum 312. The plenum 312 may provide sufficient residence time for desired degasing, may reduce liquid surges coming with the natural gas stream 102, and may provide liquid seal to a cyclonic separation occurring in a contacting section of the separation device 202a-202n. The residence time provided by the plenum 312 can vary from 5 seconds to 5 minutes, depending on the operation of the process, or from 30 seconds to 1 minute in various embodiments. The vessel 302 contains a mist eliminator 314, e.g., a wire mesh, vane pack plates, baffles, or other internal devices to reduce liquid droplet carry over from degassing gas leaving the liquid phase of rich solvent in the plenum 312. The mist eliminator 314 may also serve as a momentum breaker for the rich solvent liquid exiting the separation device 202a-202n to minimize aeration of the liquid. In embodiments installed in offshore facilities or floating facilities or otherwise subject to motion, the mist eliminator 314 may mitigate wave motion effects in the bottom portion of the vessel 302. Each contacting unit 202a-202n has a treated gas outlet 214a-214n and a rich solvent outlet 306a-306n. The vessel 302 has a vent 318 for expelling degassing gas, e.g., gas degassed from rich solvent collected in the plenum 312 that may be fed upstream or downstream of the multiple co-current contacting unit, depending on the process configuration. The treated gas outlets 214a-214n couple to an outlet tubesheet 310. The treated gas exiting the contacting units 202a-202n via the treated gas outlets 214a-214n may be referred to as the dehydrated and/or decontaminated natural gas stream 102. The vessel 302 also contains level control ports 320a and 320b for coupling a level control system (not depicted) and controlling the amount of rich solvent 326. e.g., a semi-lean solvent stream 108 or any of the partially-loaded gas treating solutions 118A-F, exiting the boot 316. Rich solvent 326 exiting the boot 316 may be sent to a regeneration system for treatment or combined with streams in other processes.

Figure 4:
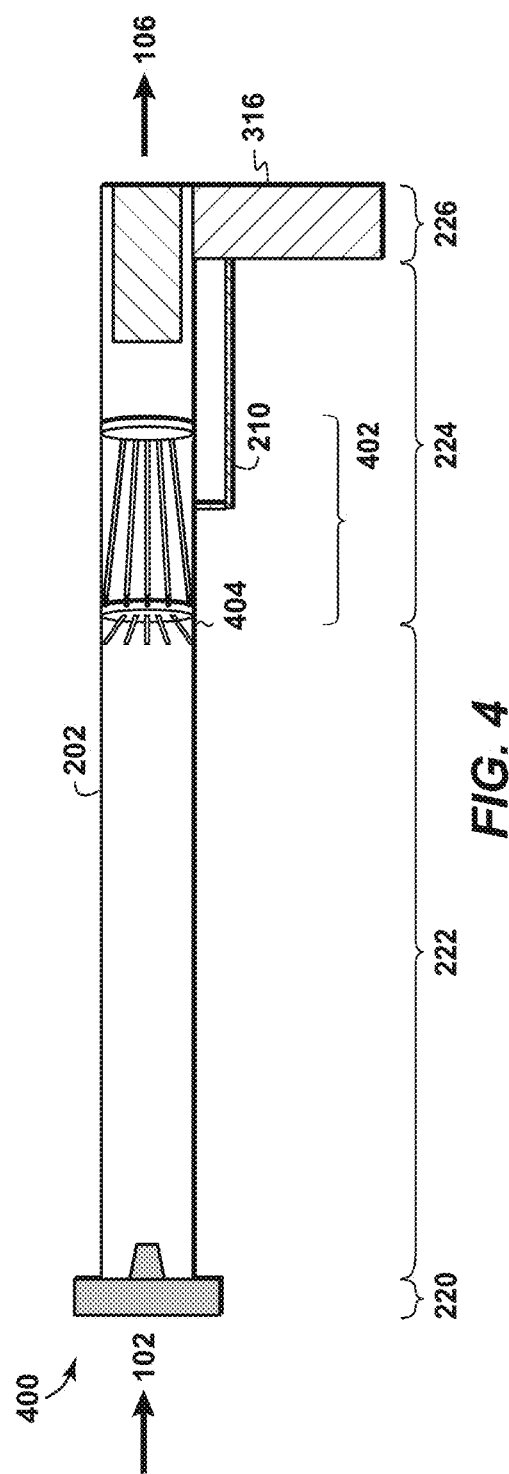
FIG. 4 is a schematic diagram of an embodiment of a co-current contactor having a coalescing section.

FIG. 4 is a schematic diagram of a co-current contactor 400. e.g., any of the co-current contacting units 202a-202d of FIGS. 2-3, having a coalescing section 402. The components of FIG. 4 are substantially the same as the corresponding components of FIGS. 2-3 except as otherwise noted. The co-current contactor 400 includes inlet section 220 and coalescing section 402 comprising one or more coalescer(s) 404, e.g., an electrostatic coalescer, a mechanical coalescer, etc. Suitable electrostatic coalescers are well known in the art and are commercially available from a variety of vendors. Suitable mechanical coalescers are well known in the art, and include baffles, spiral baffles or swirl vanes, plates, plate packs, gauze, wire mesh, random or structured packing, fiber media, etc. Suitable mechanical coalescer materials include austenitic steel, aluminum, copper, plastic, polytetrafluoroethylene (PTFE) or PTFE coated materials, polyvinylidene fluoride or polyvinylidene difluoride (PVDF), etc. Coalescer material selection decisions may consider the wettability of the material with the dispersed fluid. Coalescing media selection decisions may consider the desired coalescing efficiency with consideration to fouling and/or solids present in the system. In some embodiments, a pre-coalescer (not pictured) may be included, e.g., a pre-coalescer inline electrostatic coalescence device disposed immediately after the mass transfer section 222 and prior to a separation section 224.

In operation, the solvent entering the coalescing section 402 may have an average droplet size in a range from a first average droplet size to a second average droplet size, wherein the first average droplet size is any of: less than about 1 micrometer (μm), about 1 μm, about 5 μm, about 10 μm, about 25 μm, about 50 μm, about 75 μm, about 100 μm, about 250 μm, about 500 μm, or about 750 μm, and wherein the second average droplet size is any of: about 2 μm, about 5 μm, about 10 μm, about 25 μm, about 50 μm, about 75 μm, about 100 μm, about 250 μm, about 500 μm, about 750 μm, or about 1000 μm. After passing through the one or more coalescer(s) 404, the solvent may have an average droplet size in a range from a first average droplet size to a second droplet size, wherein the first average droplet size is any of: about 1 μm, about 5 μm, about 10 μm, about 25 μm, about 50 μm, about 75 μm, about 100 μm, about 250 μm, about 500 μm, about 750 μm, about 1000 μm, about 2500 μm, about 5000 μm, about 7500 μm, or about 9000 μm, and wherein the second average droplet size is any of: about 2 μm, about 5 μm, about 10 μm, about 25 μm, about 50 μm, about 75 μm, about 100 μm, about 250 μm, about 500 μm, about 750 μm, about 1000 μm, about 2500 μm, about 5000 μm, about 7500 μm, or about 10000 μm. In embodiments with a pre-coalescer, after passing through the pre-coalescer, the solvent may have an average droplet size in a range from a first average droplet size to a second droplet size, wherein the first average droplet size is any of: about 1 μm, about 5 μm, about 10 μm, about 25 μm, about 50 μm, about 75 μm, about 100 μm, about 250 μm, about 500 μm, about 750 μm, about 1000 μm, about 2500 μm, about 5000 μm, about 7500 μm, or about 9000 μm, and wherein the second average droplet size is any of: about 2 μm, about 5 μm, about 10 μm, about 25 μm, about 50 μm, about 75 μm, about 100 μm, about 250 μm, about 500 μm, about 750 μm, about 1000 μm, about 2500 μm, about 5000 μm about 7500 μm, or about 10000 μm.

The average residence time in the coalescer for a gas-liquid contacting system may be in a range from a first average residence time to a second average residence time, wherein the first average residence time is any of: less than about 0.01 seconds (s), about 0.01 s, about 0.1 s, or about 0.2 s, and wherein the second average residence time is any of: about 0.01 s, about 0.1 s, or about 0.2 s. The average residence time in the coalescer for a liquid-liquid contacting system may be in a range from a first average residence time to a second average residence time, wherein the first average residence time is any of: less than about 0.1 seconds (s), about 1 s, about 5 s, or about 10 s, and wherein the second average residence time is any of: about 1 s, about 5 s, about 10 s, or about 15 s.

While it will be apparent that the invention herein described is well calculated to achieve the benefits and advantages set forth above, it will be appreciated that the invention is susceptible to modification, variation and change without departing from the spirit thereof.

What is claimed is:

1. A method, comprising:
    passing a fluid into a co-current contactor, the fluid including a hydrocarbon and a contaminant;
    passing a solvent into the co-current contactor;
    dividing the solvent into solvent droplets having a first average droplet size;
    placing the fluid in contact with the solvent droplets to create a combined stream;
    absorbing the contaminant into the solvent droplets;
    coalescing at least a portion of the solvent droplets to create solvent droplets having a second average droplet size, wherein the second average droplet size is greater than the first average droplet size;
    separating the fluid from the solvent droplets;
    collecting the solvent droplets in a boot; and
    recycling gas, collecting in the boot, to the co-current contactor via a recycle gas inlet.

2. The method of claim 1, wherein the first average droplet size is between less than about 1 micrometer (μm) and about 1000 μm.

3. The method of claim 1, wherein the second average droplet size is between about 2 micrometers (μm) and about 10000 μm.

4. The method of claim 1, wherein coalescing comprises electrically inducing coalescence, mechanically inducing coalescence, or both.

5. The method of claim 1, wherein coalescing takes between less than about 0.01 seconds and about 15 seconds of residence time.

6. The method of claim 1, wherein coalescing comprises passing the combined stream through a pre-coalescer to create solvent droplets having a third average droplet size, wherein the third average droplet size is greater than the first average droplet size and less than the second average droplet size.

7. The method of claim 1, wherein the fluid and the solvent are liquids.

* * * * *